United States Patent

Aksyuk et al.

[11] Patent Number: 5,943,454
[45] Date of Patent: Aug. 24, 1999

[54] FREESPACE OPTICAL BYPASS-EXCHANGE SWITCH

[75] Inventors: Vladimir A. Aksyuk, Piscataway; David J. Bishop, Summit; Joseph E. Ford, Oakhurst; James A. Walker, Howell, all of N.J.

[73] Assignee: Lucent Technologies, Inc., Murray Hill, N.J.

[21] Appl. No.: 08/912,883

[22] Filed: Aug. 15, 1997

[51] Int. Cl.[6] .................................................. G02B 6/26
[52] U.S. Cl. .............................. 385/22; 385/15; 385/16; 385/23; 385/24; 385/31; 385/33; 385/34; 385/140
[58] Field of Search ................................. 385/15, 16, 17, 385/18, 19, 20, 21, 22, 23, 24, 25, 31, 33, 34, 140

[56] References Cited

U.S. PATENT DOCUMENTS

| | | | |
|---|---|---|---|
| 4,213,677 | 7/1980 | Sugimoto et al. | 385/34 |
| 4,239,330 | 12/1980 | Ashkin et al. | 385/33 X |
| 4,550,975 | 11/1985 | Levinson et al. | 385/34 X |
| 5,500,761 | 3/1996 | Goossen et al. | 359/290 |
| 5,588,078 | 12/1996 | Cheng et al. | 385/33 |
| 5,589,974 | 12/1996 | Goossen et al. | 359/290 |
| 5,636,052 | 6/1997 | Arney et al. | 359/291 |
| 5,654,818 | 8/1997 | Yao | 359/246 |
| 5,659,418 | 8/1997 | Yurke | 359/290 |
| 5,682,452 | 10/1997 | Takahashi | 385/85 |
| 5,742,712 | 4/1998 | Pan et al. | 385/18 |
| 5,751,469 | 5/1998 | Arney et al. | 359/291 |
| 5,796,889 | 8/1998 | Xu et al. | 385/24 |
| 5,825,528 | 10/1998 | Goossen | 359/291 |

*Primary Examiner*—Brian Healy

[57] ABSTRACT

A bypass-exchange switch for switching the path of at least one optical signal includes a telecentric imaging device for high efficiency coupling of the optical signal into either of two outputs. The switch also includes an optical director for changing the operating mode of the switch from an exchange state to a bypass state wherein the different outputs are selected. The optical director is implemented as a variable reflectivity mirror, or a mechanically-actuated mirror. The switch may include a wavelength selective filter for permanently bypassing or exchanging preselected wavelengths of the optical signals.

16 Claims, 7 Drawing Sheets

FREESPACE OPTICAL BYPASS-EXCHANGE SWITCH

FIELD OF THE INVENTION

The present invention relates generally to photonic switches. More specifically, the present invention relates to an optical bypass-exchange switch.

BACKGROUND OF THE INVENTION

Optical switches are used in a variety of applications. Some applications, such as signal routing in a multistage interconnection network, do not require high-speed switching. Other applications do; for example, fault management wherein the switches are used to reconfigure fiber networks by bypassing faulty components or nodes.

For lower-speed switching applications, bulk optomechanical switches utilizing mechanically-translated lensed fibers may be used. Optomechanical switches are desirable for such applications because, in addition to meeting the relatively slow switching-speed requirement, they are relatively inexpensive and insensitive to input signal polarization and wavelength.

Due to a relatively slow response time, which may be on the order of tens of milliseconds or more, such optomechanical switches are unsuitable for use in other applications requiring relatively high speed switching. For such higher speed switching applications, lithium niobate waveguide modulators are often used. While such modulators possess the requisite speed, they suffer from several drawbacks. Such drawbacks include a high unit cost and sensitivity to input signal polarization and wavelength.

It would be desirable to have a switch suitable for a wider range of applications than the aforementioned prior art switches. Such a switch would possess the beneficial properties of conventional optomechanical switches, but have a response speed several orders of magnitude faster.

SUMMARY OF THE INVENTION

A bypass-exchange switch for switching the optical path of at least one optical signal between two outputs is disclosed. The switch includes a telecentric imaging device for efficiently delivering a signal from an input to an output. The switch also includes an optical director that is operable to change the path of the optical signal through the switch, thereby providing the switching function.

In one embodiment, the optical director is a variable reflectivity mirror operating in a transmissive mode. When the variable reflectivity mirror is in its minimum reflectivity state, it is substantially invisible to optical signals incident thereon. As such, the signals pass substantially unimpeded to outputs across the switch, defining the cross or "exchange" state of the switch. When the variable reflectivity mirror is in its maximum reflectivity state, a substantial portion of the optical signal is reflected, so that the signals do not cross the switch. That latter operating mode describes the bar or "bypass" state of the bypass-exchange switch.

In a second embodiment, the optical director is a constant reflectivity mirror that is moved into or out of the path of optical signals traveling through the switch. When the mirror is out of the path, the signals pass to output waveguides across the switch, defining the exchange state. When the mirror is in the path, the signals are reflected, and do not cross the switch. The latter mode describes the bypass state of the bypass-exchange switch. In a presently preferred embodiment, the constant reflectivity mirror is moved by the action of a micromechanical actuator.

In a further preferred embodiment, a wavelength selective filter is positioned in front of the optical director. The filter is configured to block predetermined spectral components, i.e., wavelengths, of the optical signal. In one embodiment, the wavelength selective filter is a dielectric mirror operable to block, i.e., reflect, light of a predetermined wavelength and pass light having other wavelengths. As such, the bypass-exchange switch can be placed in a permanent bypass (or exchange) state for the blocked wavelengths, and in an exchange (or bypass) state for other wavelengths.

BRIEF DESCRIPTION OF THE DRAWINGS

Further features of the invention will become more apparent from the following detailed description of specific embodiments thereof when read in conjunction with the accompanying Figures in which.

DETAILED DESCRIPTION OF THE INVENTION

Figure 1:
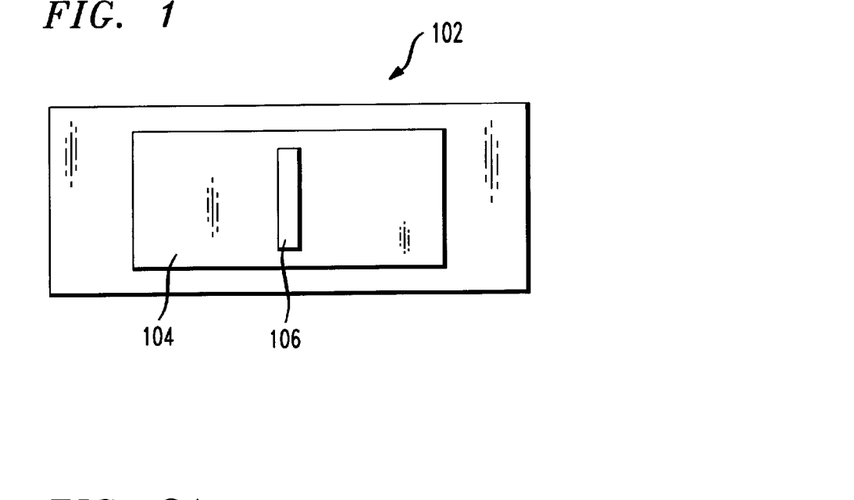
FIG. 1 shows a conceptual illustration of a bypass-exchange switch according to the present invention.

FIG. 1 shows an exemplary embodiment of a bypass-exchange switch 102 according to the present invention. As shown in that Figure, the bypass-exchange switch 102 includes a telecentric imaging device 104 and an optical director 106. The bypass-exchange switch 102 operates in two states that are enabled by the optical director 106. As described in more detail below, optical signals entering the bypass-exchange switch 102 are directed to follow different paths in those two states. Thus, as one or the other of the two states is enabled, the switching function of the bypass exchange switch 102 is realized. A controlled voltage or current source, not shown, can be used to control the action of the optical director 106 in enabling one or the other of the two switch states.

Figure 2A:
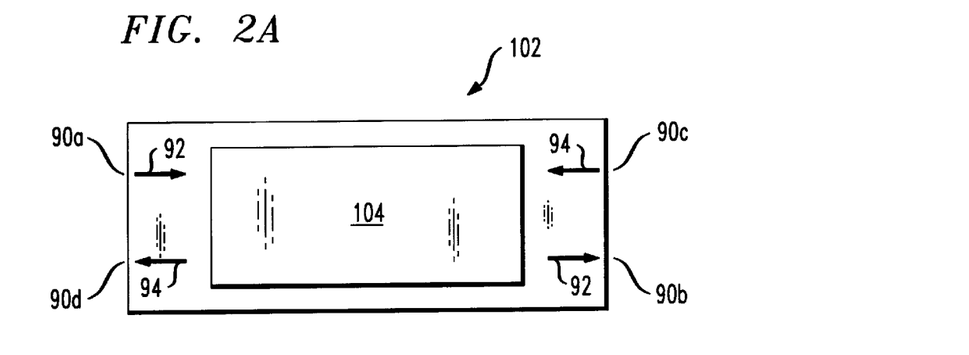
FIG. 2a shows an exemplary bypass-exchange switch in the exchange state.
Figure 2B:
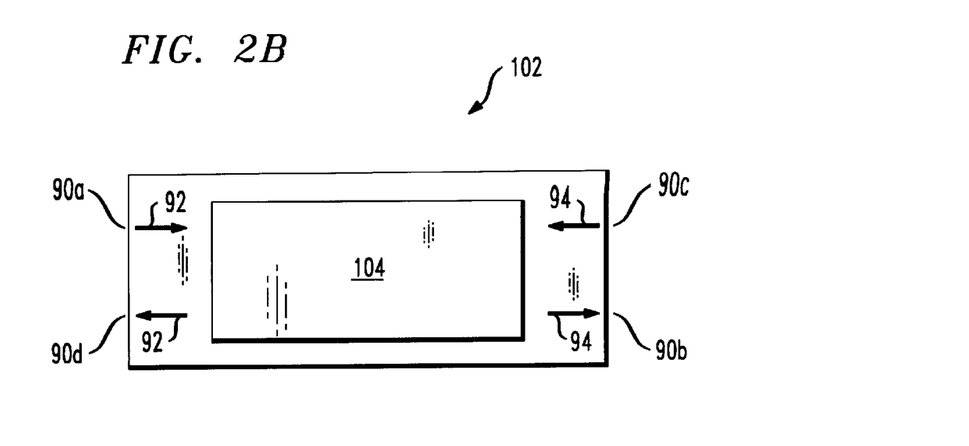
FIG. 2b shows an exemplary bypass-exchange switch in the bypass state.

The aforementioned states of the bypass exchange switch 102 are identified herein as a "exchange state" and a "bypass state." Description of those states, as defined herein, is facilitated by recourse to the illustrations provided in FIGS. 2a and 2b.

FIG. 2a shows the exchange state of the bypass-exchange switch 102 wherein, as defined herein, optical signals 92 and 94 cross the switch. In the exchange state, the telecentric imaging device 104 images the optical signal 92 emanating from a first input 90a into a first output 90b, and also images the optical signal 94 emanating from a second input 90c into a second output 90d. In some embodiments, the inputs 90a, 90c and outputs 90b, 90d are implemented as a media suitable for guiding optical signals, such as, for example, optical fibers and planar waveguides. In a presently preferred embodiment, the guiding media are optical fibers, either single or multi-mode. It should be appreciated that if the bypass-exchange switch is free-space coupled to one or more other devices, either on input, output, or both, the optical signals 92, 94 delivered to, or leaving the switch may not require a guiding media.

FIG. 2b shows the bypass state of the bypass-exchange switch 102 wherein, as defined herein, optical signals 92 and 94 are prevented from crossing the switch 102 In the bypass state, the telecentric imaging device 104 images the optical signal 92 from the first input into the second output 90d, and also images the optical signal 94 from the second input into the first output 90b.

Thus, depending upon the state of the bypass-exchange switch 102, an optical signal, such as the optical signal 92, is directed from the first input to either the first output 90b or the second output 90d.

The telecentric imaging device 104 is configured to create a telecentric optical system in both the exchange and bypass states. A telecentric system is defined as one in which the entrance pupil and/or exit pupil is located at infinity. See, Smith, *Modern Optical Engineering*, Chapter 6, Sect. 6, (McGraw-Hill, 1990). The aforementioned publication, and any other publications, including patents, cited in this specification are incorporated by reference herein. In the context of a fiber-optic system, such as wherein the inputs 90a, 90c and outputs 90b, 90d are optical fibers, telecentricity means that the optical signal, such as the optical signal 92, incident on the output fiber 90b (exchange state) or 90d (bar state) will match both spatial location and the optimum incidence angle, resulting in highly efficient coupling.

In one embodiment, the telecentric imaging device 104 is a pair of lenses 110, 112 appropriate for collimating light incident thereon. Suitable lenses include, without limitation, graded index (GRIN) lenses, ball lenses and molded lenses, such as, for example, injection molded lenses. The functioning and location of such lenses 110, 112 for providing the desired telecentric optical system is described below in conjunction with the illustrations provided in FIGS. 3a and 3b. In those Figures, the inputs 90a, 90c and outputs 90b and 90d are implemented as optical fibers.

For the purposes of the present discussion, it is assumed that the spacing $d_4$ between the second input fiber 90c and first output fiber 90b equals the spacing $d_2$ between the first input fiber 90a and the second output fiber 90d. As such, no magnification or demagnification is required, and the lenses 110 and 112 can be identical. It should be understood that the condition $d_2=d_4$ is not a requirement of the present invention and that in other embodiments $d_2 \neq d_4$.

Figure 3A:
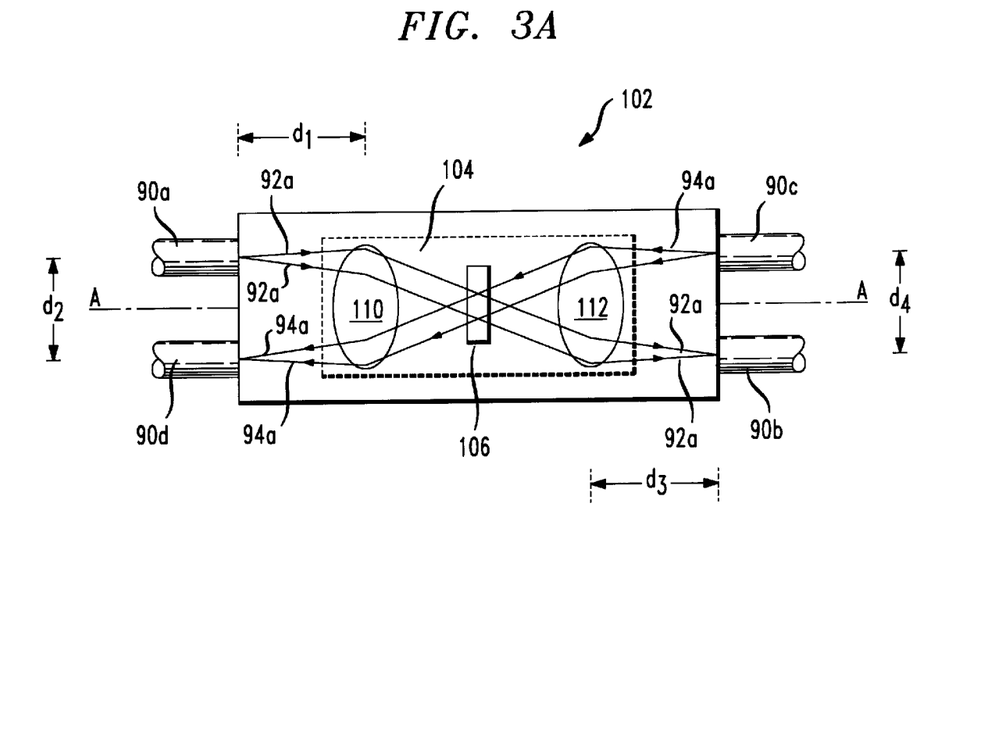
FIG. 3a shows the path of optical signals through an exemplary bypass-exchange switch in the exchange state.

FIG. 3a illustrates the exchange state wherein optical signal 92 (ray trace 92a) is imaged from first input fiber 90a into first output fiber 90b and optical signal 94 (ray trace 94a) is imaged from second input fiber 90c into second output fiber 90d. Such imaging is accomplished as follows. The collimating lens 110 is positioned at a distance $d_1$ from the first input fiber 90a. If the distance $d_1$ is equal to the focal length of the collimating lens 110, the lens will collimate light incident thereon. Thus, with $d_1$ equal to the focal length of the lens 110, the lens will collimate the optical signal 92. The collimating lens 112 is positioned at a distance $d_3$ from the second input fiber 90c. If the distance $d_3$ is equal to the focal length of the lens 112, the lens will collimate the optical signal 94. Since, as previously noted, the distance $d_2=d_4$, then $d_1=d_3$.

Thus, the optical signal 92 (ray trace 92a) is collimated by lens 110, remains collimated as received by the lens 112, and is imaged into the first output fiber 90b. The telecentric optical system is thus created by one pass through the lens 110 and one pass through the lens 112. To simplify the optics, it is preferable that the input fibers and output fibers 90a–90d are equidistant from an optical axis A—A of the lenses 110 and 112. Optical signal 94 (ray trace 94a) is collimated by lens 112, remains collimated as received by the lens 110, and is imaged into the second output fiber 90d.

Figure 3B:
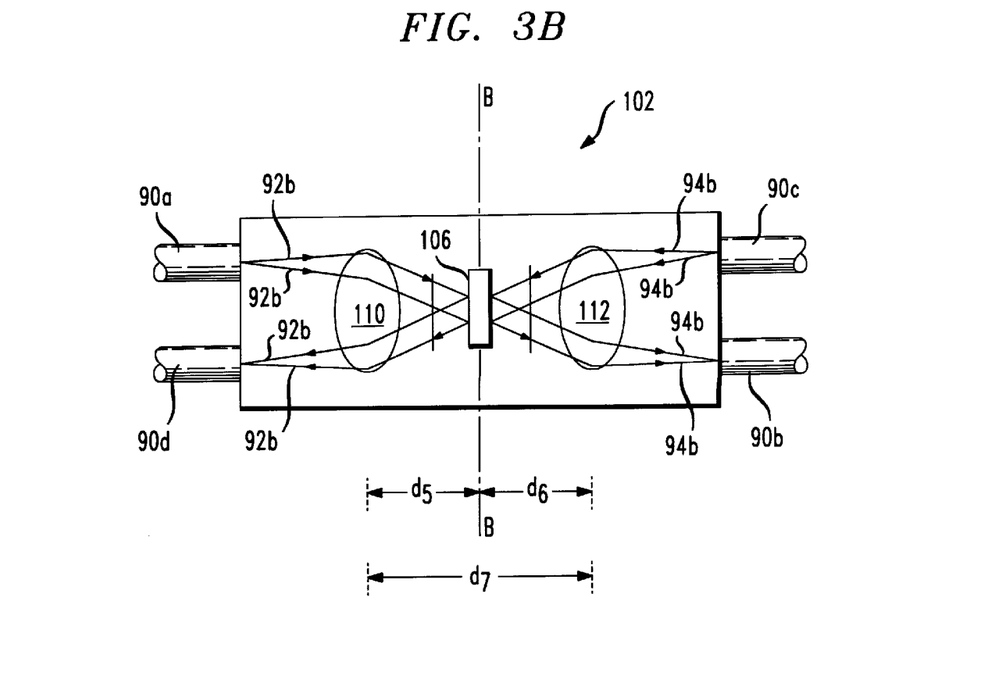
FIG. 3b shows the path of optical signals through an exemplary bypass-exchange switch in the bypass state.

The bypass state of the bypass-exchange switch is illustrated in FIG. 3b, wherein the optical signal 92 (ray trace 92b) is imaged from the first input fiber 90a into the second output fiber 90d, and optical signal 94 (ray trace 94b) is imaged from the second input fiber 90c into the first output fiber 90b. Signal 92 is imaged into the second output fiber 90d at high efficiency by situating the optical director 106 at the Fourier plane B—B, i.e., the back focal plane of the collimating lens 110, at a distance $d_5$ from the lens 110. A collimated beam entering a lens is focused to a point on a surface located at the Fourier plane. See, Goodman, *Introduction to Physical Optics*, Chapter 5, "Fourier Transforming and Imaging Properties of Lenses," (McGraw-Hill, 1968) for a mathematical definition.

Similarly, the optical director 106 is disposed a distance $d_6$ from the collimating lens 112, at the Fourier plane of the lens 112, so that the optical signal 94 is imaged into the first output fiber 90b at high efficiency . Thus, collimating lenses 110 and 112 are spaced by a distance $d_7$, wherein $d_7=d_5+d_6$. Since, in the preferred embodiment, the lenses 110 and 112 are identical, $d_5$ is equal to $d_6$, so that the Fourier plane B—B and the optical director 106 are located equidistant from the lenses 110 and 112. By placing the optical director 106 in the Fourier plane, as described above, and making two passes through the lens 92 or the lens 94, a telecentric optical system is again created.

In a presently preferred embodiment, the lenses 110, 112 are quarter-pitch GRIN lenses. As will be appreciated by those skilled in the art, a quarter-pitch GRIN lens is the shortest length GRIN lens that will substantially collimate an optical signal, such as the optical signals 92 and 94.

In a further embodiment of the present bypass-exchange switch 102, wavelength selective filters or mirrors 111, 113 are positioned in the path of respective optical signals 92, 94. The wavelength selective filters 111, 113 are configured to block, i.e., not transmit, various predetermined wavelengths of light incident thereon. As such, the bypass-exchange switch 102 can be placed in a permanent bypass (or exchange) state for those wavelengths, and in an exchange (or bypass) state for wavelengths that are not blocked ("active wavelengths"). While such filters are typically configured to block wavelengths within a particular range, it is possible to configure the filters 111, 113 to block arbitrary, i.e., discontinuous, wavelengths of the optical signal. The functioning of such wavelength selective filters 111, 113 is illustrated in FIGS. 4a and 4b.

Figure 4A:
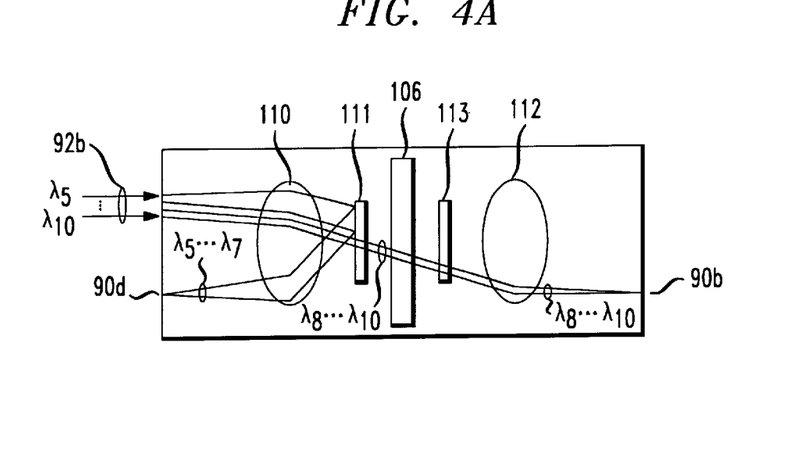
FIG. 4a shows the present bypass-exchange switch with wavelength selective filters, and further shows an exemplary routing through the switch of various spectral components of a first optical signal.
Figure 4B:
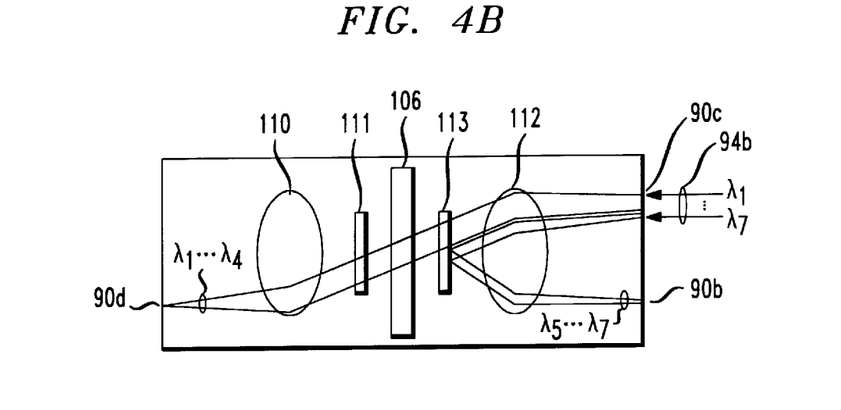
FIG. 4b shows the present bypass-exchange switch with wavelength selective filters, and further shows an exemplary routing through the switch of various spectral components of a second optical signal.

FIGS. 4a and 4b show optical signal 92b having exemplary wavelengths or spectral components $\lambda_5-\lambda_{10}$ and optical signal 94b having exemplary wavelengths $\lambda_1-\lambda_7$ entering bypass-exchange switch 102. The bypass exchange switch 102 includes wavelength selective filters 111 and 113. The wavelength selective filter 111 is placed between the lens 110 and the optical director 106 and the wavelength selective filter 113 is disposed between the lens 112 and the optical director 106. In a preferred embodiment, wherein the lenses 110 and 112 are GRIN lenses, the wavelength selective filters 111, 113 are disposed on the end surfaces of respective lenses 110, 112 closest to the optical director 106.

In the embodiment illustrated in FIGS. 4a and 4b, the exemplary wavelength selective filter 111 is identical to the wavelength selective filter 113. As an example, both filters are operable to block, by reflecting, wavelengths $\lambda_5-\lambda_7$ of the optical signals 92a, 92b, and transmit other "active" wavelengths.

FIG. 4a shows the bypass-exchange switch 102 in the exchange state for active wavelengths. For clarity, only optical signal 92b is shown in FIG. 4a. The spectral components or wavelengths $\lambda_8-\lambda_{10}$ of the optical signal 92b are transmitted through the wavelength selective filters 111, 113 and are received at the first output 90b. The wavelengths $\lambda_5-\lambda_7$ are reflected by the wavelength selective filter 111 and are received at the second output 90d. Thus, even though the bypass-exchange switch 102 is in an exchange state for active wavelengths, it is in a bypass state as to the spectral components blocked by the wavelength selective filter 111. If the switch is in the bypass state as to active wavelengths, not illustrated, then spectral components $\lambda_8-\lambda_{10}$, as well as spectral components $\lambda_5-\lambda_7$, are blocked. In the present embodiment, such blocked wavelengths are reflected to the second output 90d.

The operation of the bypass-exchange switch 102 on the optical signal 94b is illustrated in FIG. 4b. The switch 102 is again shown in the exchange state as to active wavelengths. The spectral components or wavelengths $\lambda_5-\lambda_7$ of the optical signal 94b are reflected by the wavelength selective filter 113 and are received at the first output 90b. The filters 113, 111 transmit "active" wavelengths $\lambda_1-\lambda_4$, which are received at the second output 90d. If the bypass-exchange switch is in the bypass mode, the spectral components $\lambda_1-\lambda_4$ are blocked. In the present embodiment, the blocked wavelengths are reflected to the first output 90b.

In the embodiment of the bypass-exchange switch shown in FIGS. 4a and 4b, two wavelength selective filters are shown. It should be understood that one filter, instead of two, can be used. Using two such filters avoids any temporary disruption in the propagation of the blocked wavelengths towards the appropriate output. Taking the signal 94b of FIG. 4b as an example, if the wavelength selective filter 113 was not present, then "blocked" spectral components $\lambda_5-\lambda_7$ travel to the filter 111 before they are reflected to the first output 90b. If the optical director 106 is mechanically actuated, i.e., physically moved into and out of the optical path, then disruption will occur as the signal impinges upon whatever structure surrounds the optical director 106 (as a support, etc.) since such structure will not adequately reflect the optical signal. Additionally, the use of two such filters will enable more complex or sophisticated reflections than is possible using only one filter.

The wavelength selective filters 111, 113 can be, for example, dielectric multilayer mirrors (stacks). Using an appropriate number of layers having appropriate layer thicknesses and refractive indices, such dielectric stacks can be made to reflect light of a variety of different wavelengths or wavelength ranges.

It should be understood that the designation of the particular output to which an optical signal is imaged in the exchange and bypass states is arbitrary. It should also be understood that the present bypass-exchange switch can be configured to default to either the bypass or the exchange state for all wavelengths. Additionally, it should be appreciated that in the embodiment illustrated in FIGS. 4a and 4b, the reflected wavelengths default to bypass; the active wavelengths are exchanged or bypassed as a function of the status of the optical director 106. In other embodiments, the reflected wavelengths can default to exchange.

As previously noted, the bypass-exchange switch 102 switches between the exchange state and the bypass state as a result of the action of the optical director 106. In the exchange state, the optical director 106 is substantially "invisible" to the optical signals 92 and 94. In other words, the path of the optical signals 92, 94 through the bypass-exchange switch is substantially unaffected by the optical director 106 and is controlled substantially completely via the telecentric imaging device 104. In the bypass state, the optical director 106 is visible to the optical signals 92, 94 and is operable to affect the path of such optical signals. In particular, in the bypass state, the optical director 106 reflects the optical signals 92, 94 incident thereon, as shown in FIG. 3b. Several embodiments of the optical director 106 are now described.

In a first embodiment, the optical director 106 is a variable reflectivity mirror (VRM) operating in a transmissive mode. VRM configurations suitable for such transmissive operation include, among others, micromechanical optical modulators such as described in U.S. Pat. Nos. 5,500,761; 5,589, 974; 5,636,052; 5,654,818 and in U.S. patent application Ser. Nos. 08/578,123 filed Dec. 26, 1995, now U.S. Pat. No. 5,825,528,; 08/565,453 filed Feb. 1, 1996 now U.S. Pat. No. 5,751,469; and 08/597,003 filed Feb. 5, 1996, now U.S. Pat. No. 6,659,418. The aforementioned patent applications, and any other patent applications mentioned in this specification are incorporated by reference herein.

Figure 5:
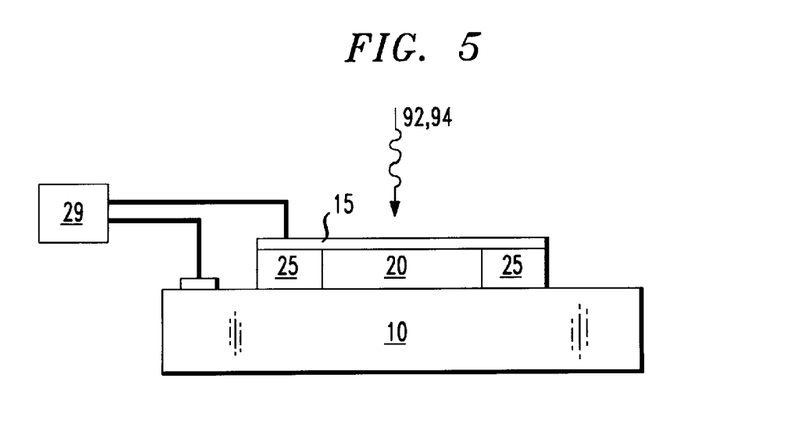
FIG. 5 is an illustrative view of a variable reflectivity mirror suitable for use in conjunction with the present invention.

The aforementioned VRMs are typified by a configuration, illustrated in FIG. 5, wherein a movable layer or membrane 15 is spaced, via a support 25, from a nonmoving layer 10 defining a gap 20 therebetween. A voltage, such as may be delivered from a controlled voltage source 29, is applied to the movable layer 15 and the nonmoving layer 10 generating an electrostatic force. The electrostatic force causes the movable layer 15 to move between a first position (maintained in the absence the applied voltage) and a second position closer to the nonmoving layer. As the movable layer 15 moves from the first position, the reflectivity of the VRM changes. Thus, the VRM can be placed in a substantially reflective state enabling the bypass state of the switch, or in a substantially transmissive state enabling the exchange state of the switch.

The movable layer 15 comprises one or more layers of materials, wherein the number of layers and their characteristic properties, e.g., refractive index, may provide different operating characteristics to the VRM. In preferred embodiments, the VRM has a "drum-head" membrane, as described in U.S. patent application Ser. No. 08/565,453, now U.S. Pat. No. 5,751,469, referenced above.

Unless otherwise noted in the aforementioned patent applications, the usual operating mode for the VRMs is as follows. Relative reflectivity maxima are encountered when the gap 20 is equal to odd integer multiples of one-quarter of a wavelength of the incident optical signal (at the design wavelength of the VRM), i.e., $m\lambda/4$ where $m=1, 3, 5 \ldots$. Furthermore, such VRMs will exhibit relative reflectivity minima when the gap 20 is 0 or an even integer multiple of one-quarter of the operating wavelength, i.e., $m\lambda/4$ where $m=0, 2, 4$.

Most of the aforementioned VRM designs can achieve zero reflectivity, i.e., 100 percent transmission through the membrane. The maximum reflectivity attained by most of such designs, however, is about eighty percent. This equates to 20 percent transmission through the membrane. Thus, if such VRMs are operated in the transmissive mode, the contrast ratio is only about 5 to 1.

A higher contrast ratio VRM is described in U.S. patent application Ser. No. 08/775,910 filed Jan. 2, 1997, pending. The VRM described therein is a Fabry-Perot-type modulator having a movable layer, i.e., membrane, characterized by a particular arrangement of dielectric layers having specified thicknesses. Such a modulator is expected to achieve about 95 percent reflectivity, i.e., 5 percent transmission, resulting in a substantially improved contrast ratio of about 20 to 1 and reduced insertion loss. That modulator comprises a silicon substrate, a layer of silicon nitride disposed thereon, a first layer of polysilicon on the silicon nitride layer, and a second layer of polysilicon suspended over the first layer of polysilicon creating a gap therebetween. The silicon nitride layer and the first layer of polysilicon have a thickness of one-quarter of a wavelength of the optical signal being modulated, as measured in the layers. The second layer of polysilicon has a thickness of three quarters of a wavelength of the optical signal, as measured in the layer.

A Fabry-Perot tunable etalon having a higher reflectivity than that disclosed in the aforementioned application Ser. No. 08/775,910, pending, is preferable for use in conjunction with the present invention since it is usually desirable to have a contrast ratio greater than 20. Such Fabry-Perot devices can be fabricated by using higher reflectivity mirrors, as is well known to those skilled in the art.

If the optical director 106 is a VRM, it can be packaged using the methods and packaging components described in aforementioned U.S. patent application Ser. No. 08/775,910, pending.

In a presently preferred embodiment, the optical director 106 is a constant reflectivity mirror that is moved into or out of the optical path of optical signals 92, 94. Based on the conventions used in this specification, if the mirror is out of the optical path, the bypass-exchange switch 102 is in the exchange state. If the mirror is in the optical path, the bypass-exchange switch 102 is in the bypass state. The mirror can be implemented in a variety of ways, including, without limitation, a dielectric stack, a metal layer, or a combination thereof.

Figure 6A:
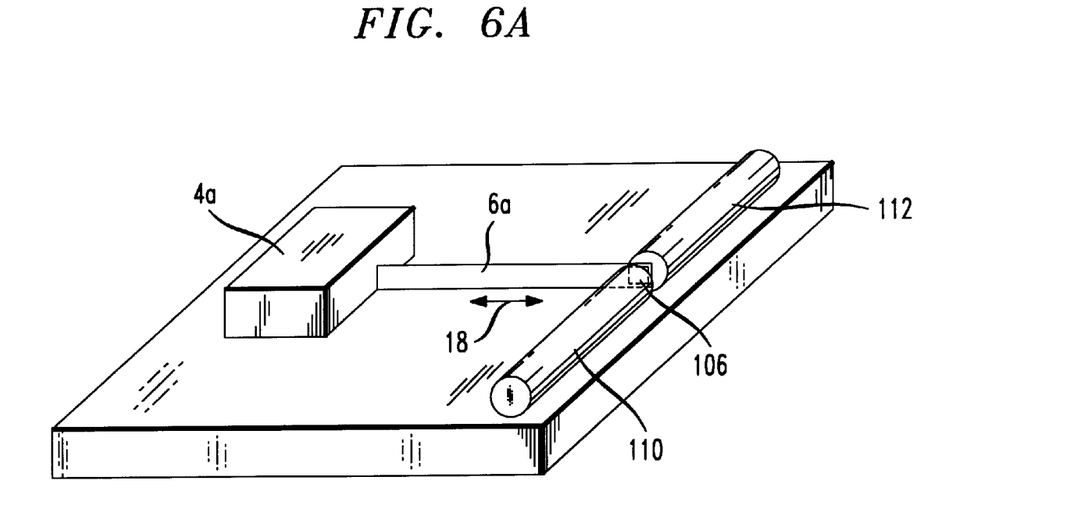
FIG. 6a shows a conceptual illustration how a hinged-plate actuator and linkage move the optical director in a substantially horizontal direction into or out of the path of the optical signals within the bypass-exchange switch.
Figure 6B:
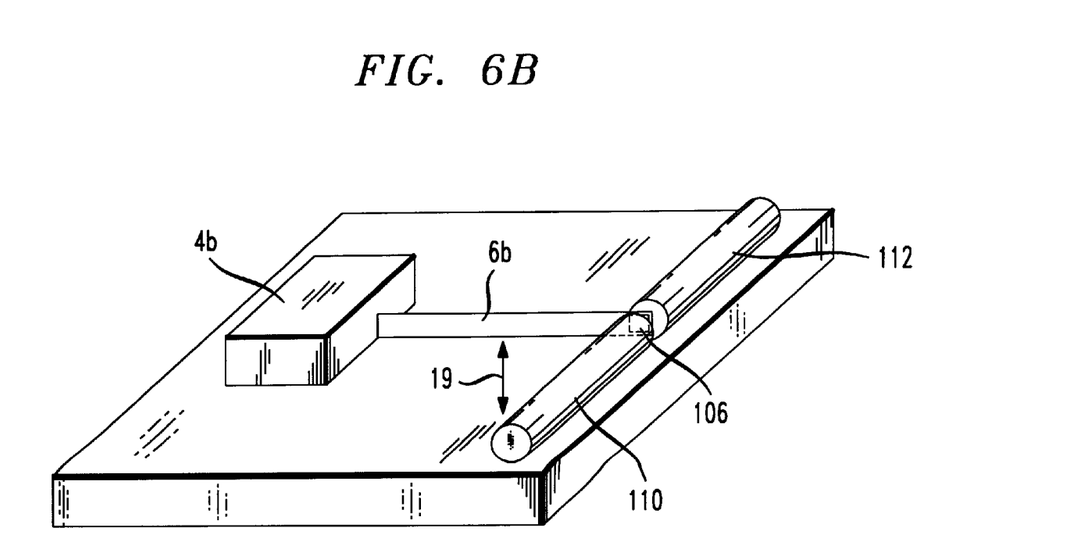
FIG. 6b shows a conceptual illustration how a hinged-plate actuator and linkage move the optical director in a substantially vertical direction into or out of the path of the optical signals within the bypass-exchange switch.

The optical director 106, if embodied as a mirror, is preferably actuated by a micromechanical hinged-plate actuator, as described in U.S. patent application Ser. No. 08/856,569, pending. In an embodiment shown in FIG. 6a, a micromechanical hinged-plate actuator 4a, in conjunction with interconnected linkage 6a and optical director support 68, is operable to move the optical director 106 in a substantially horizontal back-and-forth or reciprocating-like motion, as indicated by the direction vector 18, into and out-of the path of the optical signals 92, 94, not shown, between the lenses 110 and 112. In an alternative embodiment shown in FIG. 6b, a micromechanical hinged-plate actuator 4b, in conjunction with interconnected linkage 6b and optical director support 68, is operable to move the optical director 106 in a substantially vertical reciprocating-like motion, as indicated by the direction vector 19, into and out-of the path of the optical signals 92, 94, not shown, between the lenses 110 and 112.

It will be appreciated that in order to "direct" two optical signals, the mirror should be reflective on two sides ("two-sided mirror"), or, alternatively, two mirrors can be used, one for each of the two optical signals.

Exemplary embodiments of micromechanical hinged-plate actuators, associated linkages and optical component supports for imparting substantially horizontal or vertical reciprocating motion are illustrated and described in detail in the aforementioned application Ser. No. 08/856,569, pending.

Figure 7:
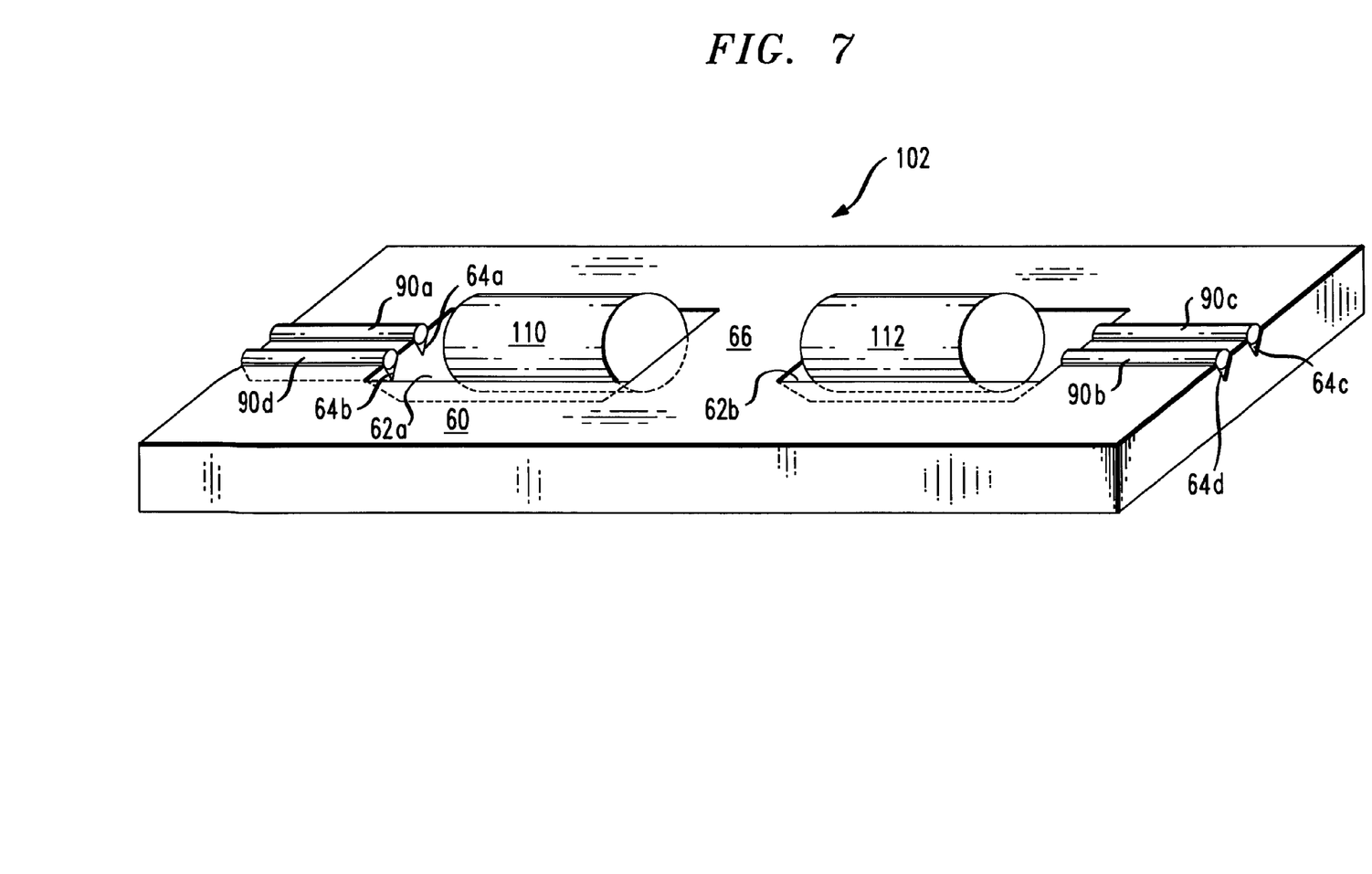
FIG. 7 shows the optics of the present bypass-exchange switch in a planar packaging arrangement on a optical assembly chip.

As shown in FIG. 7, the present bypass-exchange switch 102 can be arranged on an optical assembly ("OA") chip or substrate 60. In the embodiment shown in FIG. 7, the OA chip 60 includes two relatively deep grooves 62a, 62b for receiving respective lenses 110, 112. The OA chip 60 further includes four regions 64a–d for receiving or otherwise accommodating inputs and outputs 90a–d. In the exemplary embodiment shown in FIG. 7, inputs and outputs 90a–90d are optical fibers, and the regions 64a–d are shallow v-grooves for receiving such optical fibers.

The lenses 110, 112 are spaced providing a region 66 therebetween for accommodating the optical director 106. If implemented as a suitably-packaged transmissive VRM, the optical director 106 can be permanently fixed in place, such as by UV-cured epoxy, between the lenses 110, 112. The placement of the optical director 106, and its attachment (not shown) to the OA chip 60, are within the capabilities of those having ordinary skill in the art.

Figure 8:
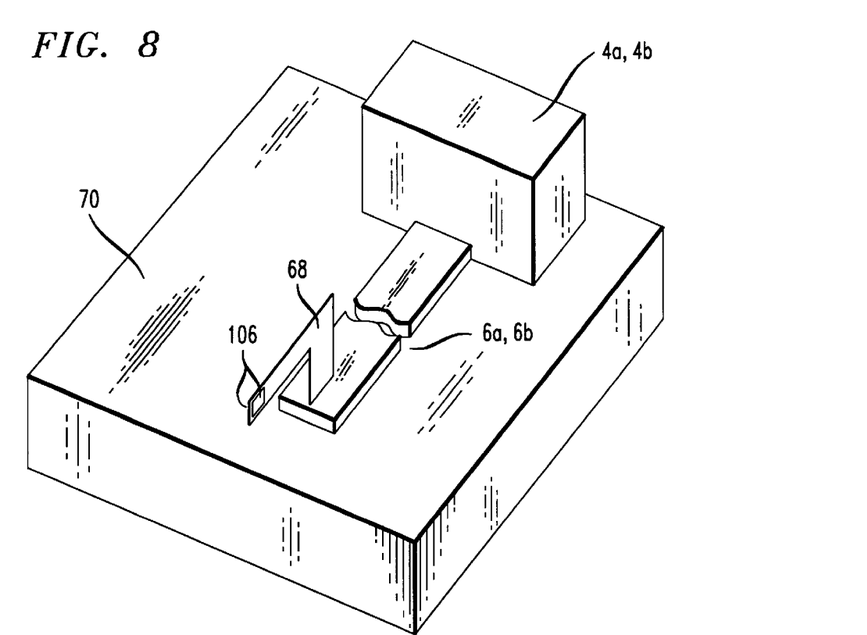
FIG. 8 shows a micromechanical hinged-plate actuator in a planar packaging arrangement on a mechanical assembly chip.
Figure 9:
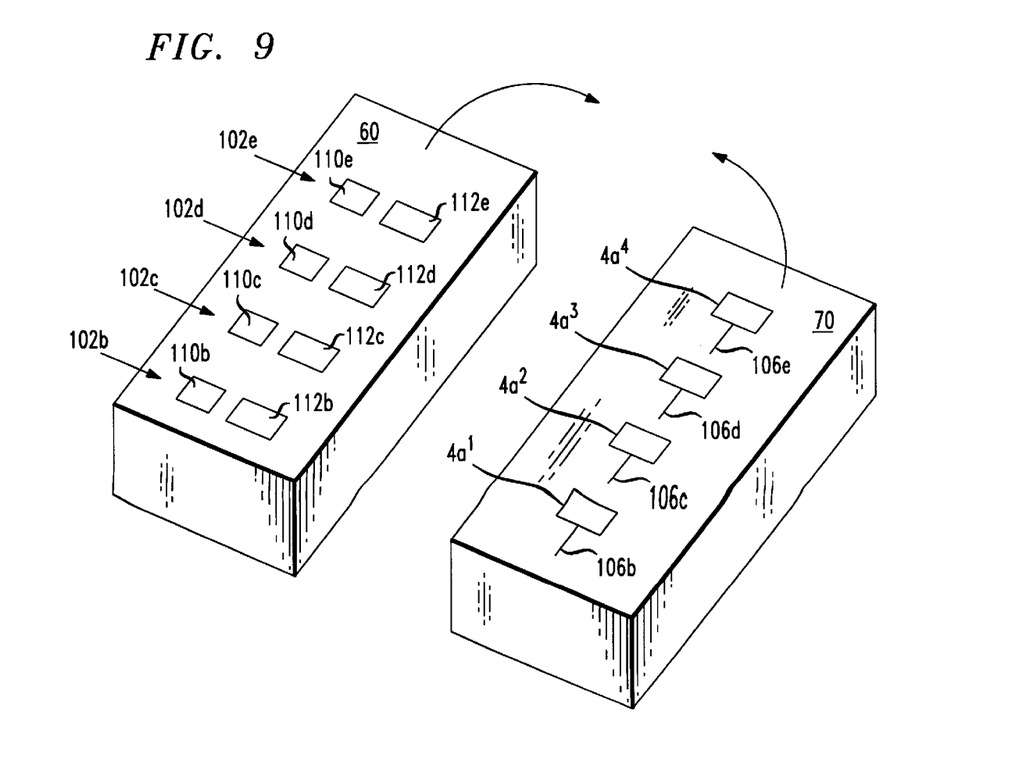
FIG. 9 shows a packaging arrangement for an array of bypass-exchange switches actuated by micromechanical hinged plate actuators.

If the optical director 106 is implemented as a mirror, a mechanical assembly ("MA") chip or substrate 70, shown in FIG. 8, can be used for supporting the micromechanical hinged-plate actuator 4a, 4b. Preferably, the OA and MA chips 60, 70 are mounted "face-to-face." Such face-to-face mounting facilitates organizing a plurality of such bypass-exchange switches and actuators into arrays, such as is shown in FIG. 9. In FIG. 9, switches 102b–102e, including collimating lens 110b–110e and 112b–112e, are disposed on OA chip 60a. Micromechanical hinged plate actuators $4a^1$–$4a^4$ with linkages to optical directors 106b–106e are disposed on MA chip 70a. The chips 60a and 70a are mated face-to-face, and the actuators $4a^1$–$4a^4$ are suitably positioned to move the linked optical directors 106b–106e into or out of the path of optical signals, not shown, traveling through bypass-exchange switches 102b–102e. It will be appreciated that the actuator 4b can be used as an alternative to the actuator 4a on the chip 70a. Methods for suitably positioning the switches and actuators and for mounting the chips are known to those skilled in the art.

In the embodiments illustrated in FIGS. 7–9, the present bypass-exchange switch 102 and the micromechanical hinged plate actuators 4a, 4b are shown in planar packaging arrangements. That is, the switch 102 and the actuators 4a or 4b are located on planar substrates. In a further embodiment pictured in FIG. 10, the bypass-exchange switch 102, and the micromechanical hinged plate actuators 4a, 4b if present, are shown in a co-axial packaging arrangement 120.

Figure 10:
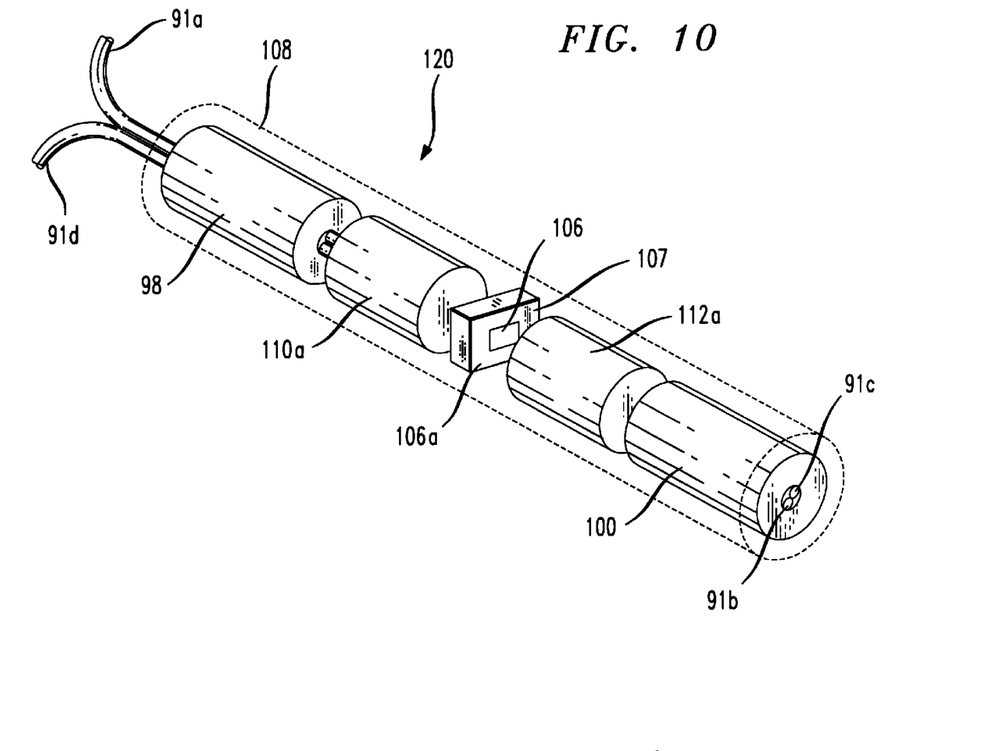
FIG. 10 shows a coaxial packaging arrangement for the present bypass-exchange switch.

In the exemplary embodiment shown in FIG. 10, the co-axial packaging arrangement 120 includes first and second dual-fiber ferrules 98, 100, an optical director chip 106a with an optical director 106 and, as appropriate, micromechanical hinged-plate actuator 4a and/or 4b, and GRIN lenses 110a, 112a. The ferrules, optical director chip and GRIN lenses are disposed within a sleeve 108 that is sized for tight-fitting receipt thereof Each of the dual-fiber ferrules 98, 100 are physically adapted to receive and align two optical fibers, such as the optical fibers 91a/91d and 91c/91b. More particularly, the dual-fiber ferrules 98, 100 are configured so that the center of the fiber core of each of the two received optical fibers is positionable in a predetermined angular orientation with respect to the ferrule. A dual-fiber ferrule suitable for use in conjunction with the co-axial packaging arrangement 120 is described in U.S. patent application Ser. No. 08/688,178, abandoned.

If the optical director 106 is embodied as a VRM, then the packaging method and packaging components described in the aforementioned U.S. patent application Ser. No. 08/775, 910, pending, are preferably used for incorporating the optical director 106 in the co-axial packaging arrangement 120. If, however, the optical director 106 is embodied as a two-sided mirror, it is preferable to modify the actuating arrangement shown in FIG. 8 for use in the co-axial packaging arrangement 120. In particular, it is preferable that the support 68 for the two-sided mirror is oriented parallel to the surface of the mirror (optical director) and in a plane parallel to the surface 107 of the chip 106a. In the previously-described embodiments utilizing a planar packaging arrangement, such as is shown in FIG. 7, the support 68 is oriented normal to the surface of the OA chip.

Figure 11:
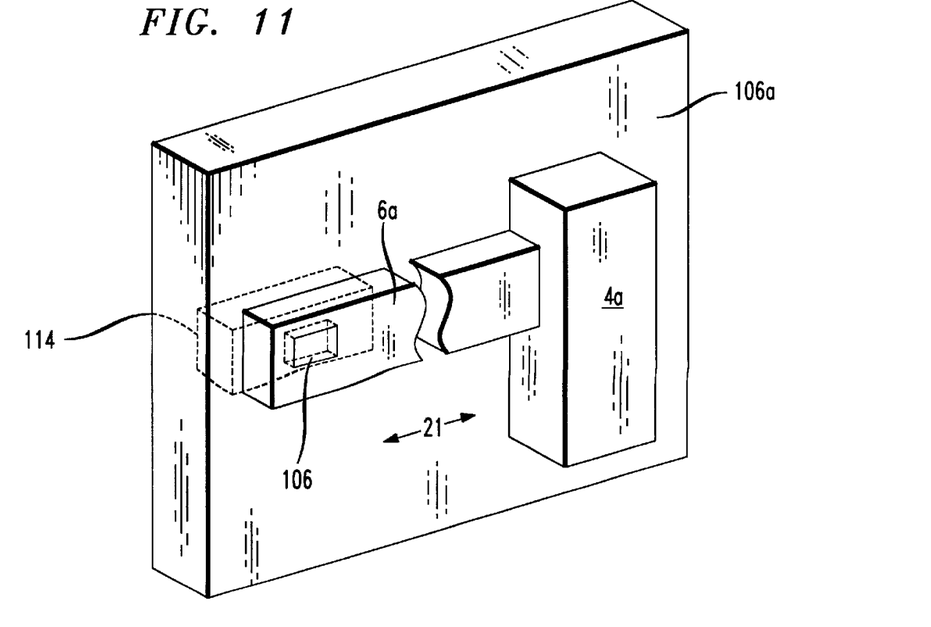
FIG. 11 shows an actuating arrangement suitable for use in conjunction with coaxial packaging of the bypass-exchange switch.

An exemplary embodiment of an actuating/linkage arrangement suitable for use in conjunction with the coaxial packaging arrangement is shown in FIG. 11. In such an embodiment, the optical director 106 is located within the linkage 6a. The actuator 4a is configured for imparting substantially horizontal reciprocating motion, as indicated by the direction vector 21, to the linkage 6a. The chip 106a, if not optically transparent at the operating wavelengths of the switch, includes a bore 114 that is located behind the optical director 106 to allow for the passage of optical signals coming from either direction.

Although specific embodiments of this invention have been described herein, it is to be understood that these embodiments are merely illustrative of the principles of this invention. Numerous and varied modifications may occur to, and be implemented by, those of ordinary skill in the art in view of the present teachings without departing from the scope and the spirit of the invention. For instance, the present switch can be configured as a 1×2 switch wherein one input is switched to either one of two outputs.

We claim:

1. An optical switch for switching a first optical signal between a first output and a second output, comprising:
a telecentric imaging device having:
a first lens disposed between a first input and the first output and characterized by a first focal length, wherein the first lens is configured to collimate the first optical signal when said first signal is received by the first lens uncollimated, and further configured to couple the first optical signal into the second output when said first optical signal is received by the first lens collimated;
a second lens disposed between the first lens and the first output and characterized by a second focal length, wherein the second lens is configured to couple the first optical signal into the first output when said first optical signal is received by the second lens collimated, and wherein the first and second lenses are separated from one another by a distance equal to the sum of the first and the second focal lengths, and further wherein the first input and the second output are in a focal plane of the first lens and the first output is in a focal plane of the second lens;
and an optical director for changing the operation of the switch between an exchange state and a bypass state, wherein,
in the exchange state, the first optical signal is imaged into the first output, and, in the bypass state, the first optical signal is imaged into the second output.

2. The optical switch of claim 1, and further wherein:
the first lens is configured to couple a second optical signal into the second output when the second signal is received by the first lens collimated, and
the second lens is configured to collimate the second optical signal when said second optical signal is received by the second lens uncollimated and further configured to couple the second optical signal into the first output when said second optical signal is received by the second lens collimated.

3. The optical switch of claim 1, wherein the lenses are graded index lenses.

4. The optical switch of claim 1, wherein the optical director is a variable reflectivity mirror.

5. The optical switch of claim 4, wherein the optical director is disposed at the back focal plane of both the first and the second lenses.

6. The optical switch of claim 1, wherein the optical director is a mirror.

7. The optical switch of claim 6, further comprising a micromechanical hinged-plate actuator for moving the optical director into or out of the telecentric imaging device, thereby changing the operation of the switch.

8. The optical switch of claim 1, further comprising a first wavelength selective filter disposed between the first lens and the back focal plane of the first lens, wherein, the first optical signal includes a plurality of wavelengths and the wavelength selective filter is operable to block preselected wavelengths and transmit wavelengths not preselected for blockage.

9. The optical switch of claim 8, and further wherein the filter blocks the preselected wavelengths by reflecting said preselected wavelengths.

10. The optical switch of claim 8, wherein the wavelength selective filter is disposed on an end of the first lens furthest from the first input.

11. The optical switch of claim 8 further comprising a second wavelength selective filter disposed between the second lens and the back focal plane of the second lens, wherein, the second optical signal includes a plurality of wavelengths and the wavelength selective filter is operable to block preselected wavelengths and transmit wavelengths not preselected for blockage.

12. The optical switch of claim 7, and further wherein the telecentric imaging device is disposed on a first surface of a first chip, and the micromechanical hinged-plate actuator for moving the optical director is disposed on a first surface of a second chip, wherein, the first surface of the first chip is disposed adjacent to the first surface of the second chip placing the telecentric imaging device and micromechanical hinged-plate actuator in an aligned relation so that the actuator is operable to move the optical director in a plane that is normal to, and intersects, a path of the first optical signal.

13. The optical switch of claim 12, and further wherein a plurality of telecentric imaging devices are disposed on the first surface of the first chip, and a plurality of micromechanical hinged-plate actuators are disposed on the first surface of the second chip, thereby providing an array of optical switches.

14. The optical switch of claim 1, wherein the first input, first output and second output are respective first, second and third optical fibers, and wherein the switch further comprises:
- a first ferrule for receiving the first input and the second output and a second ferrule for receiving the first output;
- a substrate located between the first and the second lens for supporting the telecentric imaging system and the optical director;
- a sleeve for receiving the first ferrule, the first lens, the substrate, the second lens and the second ferrule, wherein the sleeve functions to package the optical switch.

15. A wavelength-selective bypass-exchange switch for switching, between first and second outputs, a first optical signal having a plurality of wavelengths, comprising:
- first and second lenses operable to collimate the first optical signal if uncollimated and to focus, at a focal location, the first optical signal if collimated;
- an optical director which, in a first state, is substantially invisible to the first optical signal and, in a second state, is operable to affect a path of the first optical signal, wherein, the optical director is disposed in a plane passing between the first and second collimating lenses;
- a first wavelength selective filter located between the first lens and the plane in which the optical director is disposed, the first wavelength selective filter operable to reflect selected wavelengths of the first optical signal towards the first lens and transmit wavelengths not selected for blockage; and
- a second wavelength selective filter located between the second lens and the plane in which the optical director is disposed, the second wavelength selective filter operable to reflect selected wavelengths of a second optical signal towards the second lens and transmit wavelengths not selected for blockage; wherein,
- depending upon the state of the optical director wavelengths of the first optical signal not selected for blockage are reflected towards the first lens and coupled to the second output, or are transmitted to the second lens and coupled to the first output.

16. A passively-alignable optical switch, comprising:
- a first ferrule that receives a first input optical fiber and a second output optical fiber and is further physically configured such that when said first input and second output fibers are received thereby, they are positioned in a predetermined angular relationship with respect to said first ferrule;
- a second ferrule that receives a second input optical fiber and a first output optical fiber and is further physically configured such that when said second input and first output fibers are received thereby, they are positioned in a predetermined angular relationship with respect to said second ferrule;
- a telecentric imaging device comprising two lenses that are disposed between said first and second ferrules, said telecentric imaging device operable to receive a first optical signal from the first input fiber and image it into at least one of the first and second output fibers;
- an optical director movable between the two lens that changes switch operation between an exchange state wherein the first optical signal is imaged into the first output fiber, and a bypass state wherein the first optical signal is imaged into the second output fiber; and
- a sleeve for receiving the first ferrule, the telecentric imaging device, the optical director and the second ferrule, wherein, when so received, the input fibers align with the output fibers.

* * * * *